(12) United States Patent
Ha et al.

(10) Patent No.: US 12,146,033 B2
(45) Date of Patent: Nov. 19, 2024

(54) PREPARATION METHOD OF POLYARYLENE SULFIDE

(71) Applicant: LG CHEM, LTD., Seoul (KR)

(72) Inventors: Myeongjin Ha, Daejeon (KR); Joong Jin Han, Daejeon (KR); Eunju Park, Daejeon (KR); Sung Ho Lee, Daejeon (KR); Myong Jo Ham, Daejeon (KR); Jeongbin Lee, Daejeon (KR); Youngseok Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 333 days.

(21) Appl. No.: 17/270,804

(22) PCT Filed: Oct. 25, 2019

(86) PCT No.: PCT/KR2019/014209
§ 371 (c)(1),
(2) Date: Feb. 23, 2021

(87) PCT Pub. No.: WO2020/085871
PCT Pub. Date: Apr. 30, 2020

(65) Prior Publication Data
US 2021/0221954 A1 Jul. 22, 2021

(30) Foreign Application Priority Data

Oct. 26, 2018 (KR) .......... 10-2018-0129195
Oct. 18, 2019 (KR) .......... 10-2019-0129868

(51) Int. Cl.
*C08G 75/0254* (2016.01)
*C08G 75/0204* (2016.01)
(Continued)

(52) U.S. Cl.
CPC ..... *C08G 75/0254* (2013.01); *C08G 75/0204* (2013.01); *C08G 75/0209* (2013.01);
(Continued)

(58) Field of Classification Search
CPC ............ C08G 75/0254; C08G 75/0213; C08G 75/0204; C08K 5/098
See application file for complete search history.

(56) References Cited

U.S. PATENT DOCUMENTS 4,636,609 A 1/1987 Nakamata et al.
4,882,416 A 11/1989 Senatore et al.
(Continued)

FOREIGN PATENT DOCUMENTS

CN 101084274 A 12/2007
EP 0280271 A2 8/1988
(Continued)

OTHER PUBLICATIONS

Kisau et al., "Engineering Plastics Handbook", Shanghai Scientific Technical Press, Mar. 31, 2003, p. 795.
(Continued)

*Primary Examiner* — Marc S Zimmer
*Assistant Examiner* — Surbhi M Du
(74) *Attorney, Agent, or Firm* — BRYAN CAVE LEIGHTON PAISNER LLP

(57) ABSTRACT

A method is provided for preparing a low temperature thermosetting polyarylene sulfide having significantly low crystallinity while maintaining a low melt flow rate at a high polymerization yield, so as to ensure excellent laser welding
(Continued)

property and mechanical properties even when used in a molded product on the transmitting side of laser beam by a laser welding method.

12 Claims, 4 Drawing Sheets

(51) Int. Cl.
*C08G 75/0209* (2016.01)
*C08G 75/0213* (2016.01)
*C08G 75/025* (2016.01)
*C08G 75/0259* (2016.01)
*C08G 75/0281* (2016.01)
*C08K 5/098* (2006.01)

(52) U.S. Cl.
CPC ....... *C08G 75/0213* (2013.01); *C08G 75/025* (2013.01); *C08G 75/0259* (2013.01); *C08G 75/0281* (2013.01); *C08K 5/098* (2013.01)

(56) References Cited

U.S. PATENT DOCUMENTS

| | | | |
|---|---|---|---|
| 5,155,207 A * | 10/1992 | Senatore | C08G 75/0254 428/419 |
| 5,189,121 A | 2/1993 | Wright et al. | |
| 5,239,050 A | 8/1993 | Ash | |
| 5,239,051 A | 8/1993 | Geibel et al. | |
| 5,342,920 A | 8/1994 | Imai et al. | |
| 5,364,928 A | 11/1994 | Ash | |
| 6,600,009 B2 | 7/2003 | Inque et al. | |
| 2007/0021549 A1 | 1/2007 | Kojima et al. | |
| 2013/0022808 A1 | 1/2013 | Taniguchi et al. | |
| 2016/0068636 A1* | 3/2016 | Suzuki | C08G 75/00 524/726 |
| 2016/0244612 A1* | 8/2016 | Unohara | C08L 81/04 |
| 2017/0362387 A1 | 12/2017 | Konno et al. | |

FOREIGN PATENT DOCUMENTS

| | | | |
|---|---|---|---|
| JP | S60-214931 A | 10/1985 | |
| JP | 63243133 A | 10/1988 | |
| JP | 04122473 A | 4/1992 | |
| JP | 04345620 A | 12/1992 | |
| JP | H06-041516 B2 | 6/1994 | |
| JP | 2000247609 A * | 9/2000 | ............ C01B 17/22 |
| JP | 2001247676 A | 9/2001 | |
| JP | 2002-201274 A | 7/2002 | |
| JP | 3582123 B2 | 10/2004 | |
| JP | 3614486 B2 | 1/2005 | |
| JP | 3797446 B2 | 7/2006 | |
| KR | 10-0182327 B1 | 5/1999 | |
| KR | 10-0222316 B1 | 10/1999 | |
| KR | 10-1028652 B1 | 4/2011 | |
| KR | 10-2017-0093935 A | 8/2017 | |
| KR | 10-2018-0053974 A | 5/2018 | |
| KR | 10-2018-0074566 A | 7/2018 | |

OTHER PUBLICATIONS

Lee et al., "Synthesis Of p. By Copolymerization and Two-Stage Polymerization and Their Thermal Properties", Polymer(Korea), 1995, vol. 19, No. 5, pp. 685-691.

* cited by examiner

PREPARATION METHOD OF POLYARYLENE SULFIDE

The present application is a National Phase entry pursuant to 35 U.S.C. § 371 of PCT/KR2019/014209 filed on Oct. 25, 2019, and claims priority to and the benefit of Korean Patent Applications No. 10-2018-0129195 filed on Oct. 26, 2018 and No. 10-2019-0129868 filed on Oct. 18, 2019 with the Korean Intellectual Property Office, the disclosures of which are incorporated herein by reference in their entirety.

FIELD

The present invention provides a method of preparing a low temperature thermosetting polyarylene sulfide having significantly low crystallinity while maintaining a low melt flow rate.

BACKGROUND

Polyarylene sulfide (PAS), which is represented by polyphenylene sulfide (PPS), has been widely used in automobiles, electrical and electronic products, machinery and the like to replace metals, especially die casting metals such as aluminum and zinc, due to its excellent strength, heat resistance, flame retardancy, and processability. Particularly, since PPS resin has excellent flowability, it is suitable to use it as a compound by kneading with a filler such as glass fiber or a reinforcing agent.

Generally, when manufacturing a molded product having a complicated shape using such a resin, a plurality of separated parts are molded beforehand, then these parts are integrally bonded to obtain a product having a complicated shape. As means for integrally bonding a plurality of parts, bonding by adhesive agent, mechanical bonding with bolt or the like, bonding by external heat welding such as laser welding hot plate welding, and bonding by friction heat welding such as vibration welding and ultrasonic welding, have been used. Among these means, it is difficult to obtain high bonding strength by bonding with a bonding agent, and mechanical bonding requires more cost and labor and causes an increase in weight. However, bonding by external heat welding or friction heat welding has been increasingly used in recent years, because it doesn't use extra material such as adhesive agents or bolts and it doesn't cause problems such as an environmental pollution or an increase in weight.

Among external heat welding, a laser welding method, in particular, has an advantage of being performed easily. As an example, Japanese Patent Publication No. 1985-214931 discloses a laser welding method performed by irradiating a laser beam from one of superposed two molded products to the other. The laser beam transverses the molded product from the irradiated side of the molded product to the other side, and melts the resin to fuse and bond both molded products therebetween. Therefore, it is essential for the laser welding method that the laser beam transverses the molded product from the irradiated side to the molded product on the other side. Consequently, two molded products cannot be bonded, or a sufficient bonding strength cannot be obtained, if a resin material with low laser beam transmittance is used for the molded product into which the laser beam is transmitted.

However, the conventional polyphenylene sulfide resin has high crystallinity and significantly low laser beam transmittance. Therefore, in case of using the polyphenylene sulfide resin composition for a molded product on the transmitting side of laser beam in the laser welding method, it has been necessary to thin the molded product so as to transmit the laser beam. Accordingly, in case of bonding the polyphenylene sulfide resin composition by the laser welding method, there has been a problem that the degree of freedom in designing the molded product becomes inevitably low.

Therefore, there is a demand for development of a method for effectively preparing a low temperature thermosetting polyarylene sulfide having excellent mechanical properties as well as excellent laser welding properties even when used in a molded product on the transmitting side of laser beam in a laser welding method.

SUMMARY

The present disclosure provides a method of preparing a low temperature thermosetting polyarylene sulfide having significantly low crystallinity while maintaining a low melt flow rate at a high polymerization yield, so as to ensure excellent laser welding properties and mechanical properties even when used in a molded product on the transmitting side of a laser beam in a laser welding method.

According to one embodiment of the present disclosure, there is provided a preparation method of a polyarylene sulfide, including: a first step of preparing a sulfur source including a sulfide of an alkali metal and a mixed solvent by dehydrating a hydrosulfide of an alkali metal and a hydroxide of an alkali metal in the presence of a weak acid salt of an alkali metal in a mixed solvent of water and an amide-based compound; and a second step of preparing a polyarylene sulfide by adding a dihalogenated aromatic compound and an amide-based compound to a reactor containing the sulfur source, and performing a polymerization reaction; wherein the weak acid salt of an alkali metal is used in an amount of 0.25 to 0.55 equivalents based on 1 equivalent of the hydrosulfide of an alkali metal, and the dihalogenated aromatic compound includes para-dihalo aromatic compound and ortho-dihalo aromatic compound in a molar ratio of 97:3 to 88:12.

For example, the weak acid salt of an alkali metal may be used in an amount of 0.3 to 0.5 equivalents based on 1 equivalent of the hydrosulfide of an alkali metal.

In addition, the dihalogenated aromatic compound may include para-dihalo aromatic compound and ortho-dihalo aromatic compound in a molar ratio of 95:5 to 90:10.

In addition, the polyarylene sulfide may be produced at a yield of 75% or more, and may have a melt flow rate (MFR, measured at 315° C. under a load of 5 kg in accordance with ASTM D 1238) of 1200 g/10 min or less and crystallinity of 26.5% or less.

As described above, the present disclosure may provide a low temperature thermosetting polyarylene sulfide having significantly low crystallinity and a low melt flow rate at a high polymerization yield. The polyarylene sulfide can be used effectively for laser weld bonding of resin molded products in various applications such as electrical and electronic equipment, precision instrument related equipment, office equipment, automobile and vehicle related parts, construction material, wrapping material, furniture, daily goods, etc.

DETAILED DESCRIPTION

Figure 1:
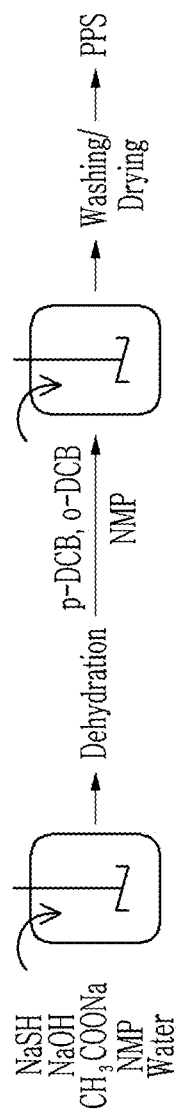
FIG. 1 is a schematic view of a process for preparing a polyarylene sulfide according to Example 1, according to one embodiment of the present disclosure.

In the present disclosure, the terms "the first", "the second", and the like are used to describe a variety of components, and these terms are merely employed to distinguish a certain component from other components.

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "possess" when used in this specification, specify the presence of stated features, numbers, steps, components, or combinations thereof, but do not preclude the presence or addition of one or more other features, numbers, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the present disclosure will be described in detail.

According to an embodiment of the present disclosure, there is provided a preparation method of a low temperature thermosetting polyarylene sulfide having significantly low crystallinity while maintaining a low melt flow rate with an excellent reactivity, in order to obtain excellent laser welding property and mechanical properties even when used in a molded product on the transmitting side of laser beam in a laser welding method.

Particularly, in preparing a polyarylene sulfide (PAS) by polymerizing a sulfur source and a dihalogenated aromatic compound in the presence of an amide-based compound such as N-methyl pyrrolidone (NMP) of the present disclosure, a weak acid salt of an alkali metal is added in an optimum amount in the dehydration for preparing a sulfur source, and para-dihalobenzene and ortho-dihalobenzene may be mixed at a predetermined molar ratio and used as the dihalogenated aromatic compound to perform polymerization, thereby reducing linearity of the polymer chain. Accordingly, the present disclosure can prepare a polyarylene sulfide having a low melting point and reduced crystallinity while maintaining a low melt flow rate with a high reactivity at a high yield.

According to the preparation method of a polyarylene sulfide provided in one embodiment of the present disclosure, a sulfur source is prepared by a dehydration reaction using a weak acid salt of an alkali metal in a predetermined amount, and then a ortho-dihalo aromatic compound is further added in a predetermined amount as the dihalogenated aromatic compound which is reacted with the sulfur source, thereby reducing linearity of the polymer chain. Accordingly, the present disclosure can prepare a polyarylene sulfide having a low melting point and low crystallinity while maintaining a low melt flow rate with a high reactivity.

The preparation method of a polyarylene sulfide includes a first step of preparing a sulfur source including a sulfide of an alkali metal and a mixed solvent by dehydrating a hydrosulfide of an alkali metal and a hydroxide of an alkali metal in the presence of a weak acid salt of an alkali metal in a mixed solvent of water and an amide-based compound; and a second step of preparing a polyarylene sulfide by adding a dihalogenated aromatic compound and an amide-based compound to a reactor containing the sulfur source, and performing a polymerization reaction.

Particularly, in order to prepare a polyarylene sulfide, the present disclosure is characterized in that a sulfur source is prepared by using a weak acid salt of an alkali metal in an amount of 0.25 to 0.55 equivalents based on 1 equivalent of the hydrosulfide of an alkali metal in dehydration using a hydrosulfide of an alkali metal, etc., and then reacted with a dihalogenated aromatic compound the may contain a para-dihalo aromatic compound and an ortho-dihalo aromatic compound in a molar ratio of 97:3 to 88:12.

The preparation method of a polyarylene sulfide according to one embodiment of the present disclosure will be described in each step.

The sulfur source is prepared by dehydrating a hydrosulfide of an alkali metal, a hydroxide of an alkali metal and an acidic compound in the presence of an organic acid salt of an alkali metal in a mixed solvent of water and an amide-based compound. Therefore, the sulfur source may include the mixed solvent of water and an amide-based compound remaining after the dehydration, together with a sulfide of an alkali metal prepared by the reaction of the hydrosulfide of an alkali metal with the hydroxide of an alkali metal.

Thereafter, in the present disclosure, a polyarylene sulfide is prepared at a high yield by continuously polymerizing the sulfur source, the dihalogenated aromatic compound and the amide-based compound.

The sulfide of an alkali metal may be determined depending on the type of the hydrosulfide of an alkali metal used in the reaction. Specific examples thereof include lithium sulfide, sodium sulfide, potassium sulfide, rubidium sulfide, and cesium sulfide, and any one or a mixture of two or more thereof may be used.

Specific examples of the hydrosulfide of an alkali metal that can be used in the preparation of the sulfur source by reacting the hydrosulfide of an alkali metal with the hydroxide of an alkali metal include lithium hydrogen sulfide, sodium hydrosulfide, potassium hydrogen sulfide, rubidium hydrogen sulfide, cesium hydrogen sulfide, and the like. Any one or a mixture of two or more thereof may be used, and an anhydride or a hydrate thereof may be used.

Specific examples of the hydroxide of an alkali metal include lithium hydroxide, sodium hydroxide, potassium hydroxide, rubidium hydroxide, cesium hydroxide and the like, and any one or a mixture of two or more thereof may be used. The hydroxide of an alkali metal may be used in an amount of about 0.90 to about 2.0 equivalents, more specifically about 1.0 to about 1.5 equivalents, and more particularly about 1.0 to about 1.1 equivalents, based on 1 equivalent of the hydrosulfide of an alkali metal.

In the present disclosure, "equivalent" refers to molar equivalent (eq/mol).

According to one embodiment of the present disclosure, in preparing the sulfur source by the reaction of a hydrosulfide of an alkali metal and a hydroxide of an alkali metal, the weak acid salt of an alkali metal may be used in an amount of about 0.25 to 0.55 equivalent, about 0.3 to 0.5 equivalent, about 0.35 to 0.48 equivalent, or about 0.4 to 0.46 equivalent, based on 1 equivalent of the hydrosulfide of an alkali metal. The weak acid salt of an alkali metal improves polymerization reactivity with the dihalogenated aromatic compound containing an ortho-dihalo aromatic compound as a polymerization aid to optimize crystallinity and melt flow rate (MFR) of the final polyarylene sulfide to be prepared, thereby achieving a high polymerization yield. In particular, when the weak acid salt of an alkali metal is used in an amount less than about 0.25 equivalents or more than about 0.55 equivalents based on 1 equivalent of the hydrosulfide of an alkali metal, the reactivity with the dihalogenated aromatic compound containing the ortho-dihalo aromatic compound becomes poor and the polymerization yield becomes low. In addition, the crystallinity of the final polyarylene sulfide to be prepared is increased and thus the polyarylene sulfide is not suitable for laser welding.

The weak acid salt of an alkali metal specifically refers to a chemical compound in which an alkali metal cation such as lithium or sodium reacts with a weak acid such as acetic acid to form a salt. For example, the weak acid may have an acid equilibrium index, pKa, of about 3.5 or more, or about 4 or more. Preferably, the weak acid salt of an alkali metal may be lithium acetate, sodium acetate, or the like, and any one or a mixture of two or more thereof may be used.

The reaction between the hydrosulfide of an alkali metal and the hydroxide of an alkali metal may be carried out in a mixed solvent of water and an amide-based compound. Specific examples of the amide-based compound include amide compounds such as N,N-dimethylformamide or N,N-dimethylacetamide; pyrrolidone compounds such as N-methyl-2-pyrrolidone (NMP) or N-cyclohexyl-2-pyrrolidone; caprolactam compounds such as N-methyl-ε-caprolactam; imidazolidinone compounds such as 1,3-dialkyl-2-imidazolidinone; urea compounds such as tetramethyl urea; phosphoric acid amide compounds such as hexamethylphosphoric acid triamide; and the like, and any one or a mixture of two or more thereof may be used. Among them, the amide-based compound may preferably be N-methyl-2-pyrrolidone (NMP), considering a reaction efficiency and a co-solvent effect as a polymerization solvent for preparing a polyarylene sulfide.

Water may be used in an amount of about 1 to 8 equivalents, specifically about 1.5 to 5 equivalents, and more specifically about 2.5 to 4.5 equivalents, based on 1 equivalent of the amide-based compound.

Meanwhile, in the first step, a sulfide of an alkali metal may be prepared by dehydrating reactants containing a hydrosulfide of an alkali metal, a hydroxide of an alkali metal and the like. Herein, the dehydration reaction may be performed by stirring at about 100 rpm to 500 rpm, more preferably at about 300 rpm to 500 rpm, at a temperature of about 185° C. to 205° C. The dehydration reaction should be performed at a temperature of about 185° C. or more to optimize the amount of effective sulfur contained in the sulfur source used in the subsequent polymerization process, so that the amount of water remaining after the dehydration is lowered to about 3.5 equivalents or less based on 1 mol of effective sulfur. In addition, the dehydration reaction should be performed at a temperature of about 205° C. or less to optimize the amount of the amide-based compound exiting the dehydration reaction, so that the amount of water remaining in the sulfur source is about 1.5 equivalents or more based on 1 mol of effective sulfur.

During the dehydration reaction, the solvent such as water in the reactants may be removed by distillation or the like, and some of the amide-based compound may be discharged together with the water. In addition, some of the sulfur contained in the sulfur source may react with water by heat during the dehydration reaction, and may be volatilized as hydrogen sulfide gas. At this time, a hydroxide of an alkali metal having the same number of moles as the hydrogen sulfide may be generated.

Particularly, a dehydrated liquid generated during the dehydration reaction in the first step, that is, a dehydration liquid removed to the outside during the dehydration reaction may contain about 25% (v/v) to about 35% (v/v) of the amide-based compound based on a total volume of the entire mixture containing the mixed solvent of water and an amide-based compound.

As a result of the reaction of the hydrosulfide of an alkali metal, the hydroxide of an alkali metal and the alkali metal salt, a sulfide of an alkali metal is precipitated in a solid phase in the mixed solvent of water and an amide-based compound. And some unreacted hydrosulfide of an alkali metal may remain in the reaction system. Accordingly, when the sulfur source prepared by reacting the hydrosulfide of an alkali metal with the hydroxide of an alkali metal is used as a sulfur source in the preparation of a polyarylene sulfide according to the present disclosure, the molar ratio of the sulfur source refers to a total molar ratio of the sulfide of an alkali metal precipitated as a result of the reaction and the unreacted hydrosulfide of an alkali metal.

Further, during the dehydration reaction, the sulfur contained in the sulfur source, which remains in the hydrosulfide of an alkali metal introduced as the sulfur-containing reactant in the system, reacts with water to produce hydrogen sulfide and a hydroxide of an alkali metal, and the generated hydrogen sulfide is volatilized. Therefore, the amount of sulfur in the sulfur source remaining in the system after the dehydration reaction may be reduced by the hydrogen sulfide which is volatilized out of the system during the dehydration reaction. For example, when using the sulfur source mainly containing a hydrosulfide of an alkali metal, the amount of sulfur remaining in the system after the dehydration reaction is equal to the molar amount of sulfur in the sulfur source introduced as a reactant, which is the hydrosulfide of an alkali metal introduced as the sulfur-containing reactant, minus the molar amount of hydrogen sulfide volatilized out of the system. Therefore, it is necessary to quantify the amount of effective sulfur contained in the sulfur source remaining in the system after the dehydration reaction from the amount of hydrogen sulfide volatilized out of the system. Specifically, the dehydration reaction may be carried out until the molar ratio of water remaining in the system after the dehydration process to 1 mol of effective sulfur is about 1.5 to 3.5, specifically about 1.6 to 3.0, more specifically about 1.8 to 2.8. When the water content in the sulfur source is excessively decreased by the dehydration reaction, water may be added to adjust the water content before the polymerization process.

Accordingly, the sulfur source prepared by the reaction of the hydrosulfide of an alkali metal with the hydroxide of an alkali metal and the dehydration as described above may include a mixed solvent of water and an amide-based compound together with a sulfide of an alkali metal, and the water may be included in a molar ratio of about 1.5 to 3.5 based on 1 mol of sulfur contained in the sulfur source. In addition, the sulfur source may further include a hydroxide of an alkali metal prepared by the reaction of sulfur with water.

According to one embodiment of the present disclosure, the second step is polymerizing the sulfur source with a dihalogenated aromatic compound to prepare a polyarylene sulfide.

In particular, the dihalogenated aromatic compound may include a para-dihalo aromatic compound and an ortho-dihalo aromatic compound, and their molar ratio (para-dihalo aromatic compound:ortho-dihalo aromatic compound) is about 97:3 to 88:12 based on a total amount of the dihalogenated aromatic compound. In addition, the dihalogenated aromatic compound may include the para-dihalo aromatic compound and the ortho-dihalo aromatic compound in a molar ratio of about 96:4 to 89:11, or about 95:5 to 90:10.

When the content of the ortho-dihalo aromatic compound is less than about 3 mol % based of a total amount of the dihalo aromatic compound, linearity of the polymer chain in the polyarylene sulfide to be prepared increases, and crystallinity also increases, thereby decreasing laser transmittance. Thus, it may be unsuitable for laser welding. On the other hand, when the content of the ortho-dihalo aromatic compound exceeds about 12 mol %, steric hinderance due to the structure of the ortho-dihalo aromatic compound occurs during the polymerization reaction, resulting in poor polymerization reactivity. As a result, a yield and melt flow rate (MFR) may be deteriorated. In addition, this may result in damage to mechanical properties or heat resistance during processing of molded products, thereby causing problems in practicality. Therefore, the content of the ortho-dihalo aromatic compound is preferably maintained in the above-described range in view of simultaneously lowering the melt flow rate (MFR), the melting point and crystallinity of the polyarylene sulfide, so as to ensure excellent laser welding properties as well as excellent durability and chemical resistance of the final polyarylene sulfide to be prepared.

Meanwhile, in the present disclosure, the dihalogenated aromatic compound refers to a compound in which two hydrogens in the aromatic ring are substituted with halogen atoms.

The ortho-dihalo aromatic compound is a position isomer, which is one of structural isomers of the dihalo aromatic compound and refers to a compound having a structure in which two halogen groups substituted in the aromatic compound are located adjacent to each other at positions 1 and 2.

Specific examples thereof include o-dihalobenzene, o-dihalotoluene, and o-dihalobenzoic acid, and any one or a mixture of two or more thereof may be used. In the ortho-dihalo aromatic compound, the halogen atom may be fluorine, chlorine, bromine or iodine. Among them, ortho dichlorobenzene (o-DCB) may be used in view of effectively lowering the melting point and crystallinity of the polyarylene sulfide.

In addition, the para-dihalo aromatic compound, other than the ortho-dihalo aromatic compound among the dihalogenated aromatic compound, refers to a compound having a structure in which two halogen groups substituted in the aromatic compound are located to face each other at positions 1 and 4.

Specific examples thereof include p-dihalobenzene, p-dihalotoluene, and p-dihalobenzoic acid, and any one or a mixture of two or more thereof may be used. Herein, the halogen atom may be fluorine, chlorine, bromine or iodine. Among them, para dichlorobenzene (p-DCB) may be used in consideration of reducing reactivity and side reactions in the preparation of a polyarylene sulfide.

Meanwhile, the dihalogenated aromatic compound may be added in an amount of about 0.8 to 1.2 equivalents based on 1 equivalent of the sulfur source. When the dihalogenated aromatic compound is added within the above range, a polyarylene sulfide having excellent physical properties may be obtained without reducing a melt viscosity and increasing the content of chlorine present in the polyarylene sulfide. The dihalogenated aromatic compound may be added in an amount of about 0.9 to about 1.1 equivalents in order to achieve the excellent effect of controlling the input amount of the sulfur source and the dihalogenated aromatic compound.

Further, a step of lowering the temperature of the reactor containing the sulfur source to a temperature of about 150° C. to 200° C., about 160° C. to 190° C., or about 170° C. to 185° C. may be further included before the second step to prevent vaporization of the dihalogenated aromatic compound.

Further, the polymerization reaction of the sulfur source and the dihalogenated aromatic compound may be carried out in a solvent of an amide-based compound which is a polar aprotic organic solvent and stable to an alkali at a high temperature.

Specific examples of the amide-based compound are as described above, and pyrrolidone compounds such as N-methyl-2-pyrrolidone (NMP) or N-cyclohexyl-2-pyrrolidone are preferable considering the reaction efficiency.

Since the amide-based compound contained in the sulfur source in the first step may function as a co-solvent, the amide-based compound may be added in the second step in a molar ratio of water ($H_2O$) to the amide-based compound present in the polymerization system (a ratio of water/an amide-based compound) to be about 0.85 or more.

In particular, the amide-based compound further added in the second step may be added in an amount of about 1.0 to about 2.0 equivalents, or about 1.1 to about 1.85 equivalents based on 1 equivalent of the hydrosulfide of an alkali metal. Herein, when performing the polymerization reaction in the second step, the amide-based compound is further added so as to have a molar ratio of 2.5 to 4.0 based on 1 mol of sulfur. This corresponds to the content of the final amide-based compound present in the system during the polymerization reaction of the second step, and is a total amount of the amide-based compound remaining in the sulfur source obtained by the dehydration reaction in the first step and the amide-based compound further added in the second step. Meanwhile, the final content of the amide-based compound present in the system during the polymerization reaction of the second step can be confirmed, for example, by subtracting the amount of the amide-based compound discharged to the dehydrated liquid of the first step from the total amount of the amide-based compound added during the first step and the second step.

During the polymerization reaction, other additives such as a molecular weight regulator, a cross-linking agent and the like for controlling the polymerization reaction or the molecular weight may be further added in an amount not lowering physical properties and the yield of the polyarylene sulfide to be finally prepared.

Meanwhile, the polymerization process of the second step for preparing a polyarylene sulfide by polymerizing the sulfur source and the dihalogenated aromatic compound may be performed at about 200° C. to 300° C. Alternatively, the polymerization process may be performed in multi-steps while varying the temperature within the above temperature range.

For example, the polymerization process of the present disclosure includes a pre-polymerization process for preparing a pre-polymer of polyarylene sulfide by reacting a halogenated aromatic compound with a sulfur compound and a post-polymerization process for increasing the molecular weight and melt viscosity using the pre-polymer. Specifically, a first polymerization reaction may be performed at a temperature of about 200° C. to about 245° C., and then a second polymerization reaction may be continuously performed at a temperature higher than that of the first polymerization reaction, specifically at about 250° C. to about 260° C.

In order to effectively prepare the pre-polymer, the first polymerization reaction may be performed at a temperature of about 200° C. or more to about 245° C. or less in terms of improving conversion and yield of the dihalo aromatic compound including ortho-dihalo aromatic compound. Herein, the first polymerization reaction may be performed at a temperature of about 210° C. or more to about 240° C. or less, or about 220° C. or more to about 235° C. or less.

In addition, the second polymerization reaction may be performed at a temperature of about 250° C. or more to maintain the melt viscosity at a sufficient level to effectively perform injection molding. Excessive temperature rise may lower the yield and decrease the melt viscosity due to high temperature decomposition, so the reaction may be performed at a temperature of 260° C. or less. Herein, the second polymerization reaction may be performed at a temperature of about 253° C. or more to about 260° C. or less, or about 255° C. or more to about 260° C. or less.

In the polymerization process, the temperature may be changed at about 0.35° C./min to 2° C./min, about 0.4° C./min to 1.5° C./min, or about 0.5° C./min to 1.2° C./min from the first polymerization reaction to the second polymerization reaction.

Meanwhile, a reaction time from the addition of the aromatic compound in the first polymerization reaction until the temperature increases to the second polymerization reaction temperature may be about 1.5 hours to about 4 hours, or about 2 hours to about 3 hours.

In addition, a reaction time from the completion of the temperature increase in the second polymerization reaction until water is added for cooling may be about 0.3 hour to about 3 hours, or about 0.5 hour to about 2 hours.

A reaction product prepared as a result of the above polymerization reaction is separated into an aqueous phase and an organic phase, and a polyarylene sulfide, which is a product of the polymerization reaction, is dissolved in the organic phase. Accordingly, a process for precipitation and separation of the prepared polyarylene sulfide may be optionally performed.

In particular, the precipitation of the polyarylene sulfide may be carried out by adding water to the reaction mixture in an amount of about 3 to 5 equivalents based on 1 equivalent of sulfur, and then cooling. When the water is added within the above range, the polyarylene sulfide may be precipitated with excellent efficiency.

The precipitated polyarylene sulfide may be optionally further subjected to washing, filtration and drying according to conventional methods.

As a specific preparation method of the polyarylene sulfide, following examples may be referred to. However, the preparation method of the polyarylene sulfide is not limited to this description. The preparation method may further include a step which is usually carried out in the technical field of the present invention, and the step(s) of the preparation method may be changed by the step(s) usually changeable.

Meanwhile, the preparation method of a polyarylene sulfide according to one embodiment of the present disclosure may easily prepare a polyarylene sulfide at a high polymerization yield while reducing the melting point and crystallinity in order to have excellent laser welding properties with a low melt flow rate (MFR), thereby achieving better mechanical properties than the conventional method.

Specifically, the polyarylene sulfide may be produced at a yield of 75% or more according to the above-described method, and may have a melt flow rate (MFR, measured at 315° C. under a load of 5 kg in accordance with ASTM D 1238) of about 1200 g/10 min or less, or about 500 g/10 min to 1200 g/10 min, and crystallinity of about 26.5% or less, or about 3.0% to 26.5%.

Preferably, the yield of the polyarylene sulfide may be about 79% or more, about 80% or more, or about 84% or more.

Preferably, the melt flow rate (MFR) may be about 1100 g/10 min or less or about 550 g/10 min to 1100 g/10 min, about 1000 g/10 min or less or about 580 g/10 min to 1000 g/10 min, or about 980 g/10 min or less or about 600 g/10 min to 980 g/10 min. Herein, the melt flow rate may be measured at 315° C. under a load of 5 kg in accordance with the American Society for Testing and Materials, ASTM D 1238. In particular, the melt flow rate (MFR) may be maintained in the above-described range in terms of improving processability in using the polyarylene sulfide as a molded product. For example, a polyarylene sulfide having the melt flow rate (MFR) of more than about 1200 g/10 min is not large enough in molecular weight to have properties of the polymer, and such polyarylene sulfides may not have excellent durability and chemical resistance.

Preferably, the polyarylene sulfide may have crystallinity of about 26.1% or less or about 3.5% to 26.1%, about 25.5% or less or about 4% to 25.5%, or about 22% or less or about 5% to 22%. The crystallinity may be measured using differential scanning calorimeter (DSC, manufactured by TA instrument, TA Q2000). A method of measuring the crystallinity may be more specified in the following Examples. The crystallinity may be maintained in the above-described range in terms of ensuring excellent laser welding property when the polyarylene sulfide is used in a molded product on the transmitting side of laser beam by a laser welding method.

Meanwhile, the polyarylene sulfide may have a melting point (Tm) of about 280° C. or less or about 230° C. to 280° C., about 275° C. or less or about 235° C. to 275° C., or about 264° C. or less or about 240° C. to 264° C.

The melting point (Tm) of the polyarylene sulfide may be measured using differential scanning calorimeter (DSC, manufactured by TA instrument, TA Q2000).

For example, the polyarylene sulfide is heated to 325° C., and maintained at that temperature for 5 minutes. After that, the temperature is lowered to 50° C., and increased again to 325° C. The temperature at the top of the DSC (Differential Scanning calorimeter, manufactured by TA) curve is referred to as the melting point. Herein, the temperature is increased and lowered at a rate of 10° C./min, respectively, and the melting point is confirmed at the second heating period.

In addition, the polyarylene sulfide may have a crystallization point ($T_c$) of about 180° C. to 250° C. Herein, the crystallization point ($T_c$) of the polyarylene sulfide may be measured using differential scanning calorimeter (DSC, manufactured by TA instrument, TA Q2000). As the measuring method is well known in the art, a detailed description thereof will be omitted.

In addition, the polyarylene sulfide may have a melt viscosity of about 20 Pa·S to 150 Pa·S. Herein, the melt viscosity of the polyarylene sulfide may be measured using ARES-G2 (Advanced Rheometric Expansion System). For example, the polyarylene sulfide resin (approximately 5 g to 10 g of dry sample) was placed on an equilibrium plate, and the melt viscosity is measured at 300° C. by changing an angular frequency from 0.1 to 100 rad/s using a frequency sweeping method.

The polyarylene sulfide may have a weight average molecular weight (Mw) of more than about 10,000 g/mol to about 30,000 g/mol or less. Herein, the weight average molecular weight (Mw) of the polyarylene sulfide may be measured using gel permeation chromatography (GPC). For example, it may be measured using PL-GPC220 (Waters) as a GPC apparatus and PLgel MIX-B 300 mm length column (Polymer Laboratories). The measuring method is well known in the art, and will not be described in detail.

Hereinafter, the present invention will be described in more detail with reference to the following preferred examples. However, these examples are for illustrative purposes only, and the invention is not intended to be limited by these examples.

EXAMPLES

Example 1

Sodium sulfide was prepared by mixing 70% sodium hydrosulfide (NaSH) and sodium hydroxide (NaOH) in an equivalent ratio of 1:1.05 to prepare a PPS polymer. At this time, 0.35 equivalents of sodium acetate ($CH_3COONa$) powder, 1.65 equivalents of N-methyl-2-pyrrolidone (NMP), and 4.72 equivalents of deionized water (DI water) were added to the reactor. Herein, the equivalent refers to molar equivalent (eq/mol). As described above, NaSH, NaOAc, NaOH, NMP, and DI water were put into the reactor, and the reactor was fastened. At this time, the solid reagent was added first, followed by NMP, DI water. After making the reactor in a nitrogen atmosphere, the nitrogen line was removed.

Then, the reactor was stirred at 450 rpm using a pitched paddle impeller, and dehydrated by heating for 1 hour and 40 minutes to about 195° C. At this time, when the dehydration valve was slowly opened and the reactor was heated after the initiation of the reaction, steam started to be generated inside the reactor. The steam was collected after liquefying by installing a cooler at the bottom. When the dehydrated liquid reached 410 mL, the dehydration valve was closed and the heater was turned off to lower the temperature. Thereafter, the temperature of the reactor was lowered to about 180° C., and a mixed solution in which para-dichlorobenzene (p-DCB) and ortho-dichlorobenzene (o-DCB) were dissolved in 1.35 equivalents of N-methyl-2-pyrrolidone (NMP) based on sodium hydrosulfide was introduced into the reactor using a metering pump. A molar ratio of p-DCB:o-DCB in the mixed solution was 95:5, and a total amount of p-DCB and o-DCB was 1.04 times more equivalent than sodium hydrosulfide. Thereafter, the reaction mixture was heated to about 230° C. and reacted for about 3 hours as a front reaction, and further heated to about 260° C. for about 40 minutes and reacted for about 1 hour as a rear reaction.

After the reaction was completed, 3.03 equivalents of DI water based on 1 equivalent of sulfur was added to the reactor and stirred for about 5 minutes. Thereafter, the reactor was cooled overnight, and the valve was opened to remove remaining unreacted p-DCB, o-DCB and solvent. When the pressure was equal to normal pressure, the reactor was opened to recover a PPS slurry. The obtained PPS slurry was washed in a mixed solution of NMP and DI water at room temperature, filtered, and washed again with water. Thereafter, it was washed twice with 100° C. NMP, once with 100° C. 0.4 wt % acetic acid aqueous solution, and 4 times with 100° C. DI water until pH reached 7. Then, it was dried using a convection oven and a vacuum oven.

Examples 2 to 4

A PPS polymer was prepared in the same manner as in Example 1, except that the amount of sodium acetate ($CH_3COONa$) added to the reactor was changed as shown in Table 1.

Example 5

A PPS polymer was prepared in the same manner as in Example 3, except that the para-dichlorobenzene (p-DCB) and the ortho-dichlorobenzene (o-DCB) were mixed and added so that the molar ratio of p-DCB:o-DCB was 90:10 as shown in Table 1.

Example 6

A PPS polymer was prepared in the same manner as in Example 6, except that the amount of sodium acetate ($CH_3COONa$) added to the reactor was changed as shown in Table 1.

Comparative Example 1

A PPS polymer was prepared in the same manner as in Example 1, except that the ortho-dichlorobenzene (o-DCB) was not mixed and only the para-dichlorobenzene (p-DCB) was added so as to be 1.04 times more equivalent than sodium hydrosulfide as shown in Table 1.

Comparative Example 2

A PPS polymer was prepared in the same manner as in Example 1, except that meta-dichlorobenzene (m-DCB) was mixed and added instead of the ortho-dichlorobenzene (o-DCB) as shown in Table 1.

Comparative Example 3

A PPS polymer was prepared in the same manner as in Comparative Example 2, except that the para-dichlorobenzene (p-DCB) and the meta-dichlorobenzene (m-DCB) were mixed and added so that the molar ratio of p-DCB:m-DCB was 90:10 as shown in Table 1.

Comparative Examples 4 to 5

A PPS polymer was prepared in the same manner as in Example 1, except that the amount of sodium acetate (NaOAc, $CH_3COONa$) added to the reactor was changed to 0.2 equivalent and 0.6 equivalent, respectively, based on 1 equivalent of NaSH as shown in Table 1.

Comparative Example 6

A PPS polymer was prepared in the same manner as in Example 4, except that lithium chloride (LiCl) was used instead of the sodium acetate (NaOAc, CH₃COONa) added to the reactor as shown in Table 1.

Comparative Example 7

A PPS polymer was prepared in the same manner as in Example 4, except that sodium chloride (NaCl) was used instead of the sodium acetate (NaOAc, CH₃COONa) added to the reactor as shown in Table 1.

In the preparation of a polyphenylene sulfide according to Examples and Comparative Examples, specific mixing compositions of dichlorobenzene (DCB) and a reacting compositions are as shown in Table 1 below.

TABLE 1

| | Isomer content in DCB (mol %) | | | Reacting composition (equivalent) | | | | | |
|---|---|---|---|---|---|---|---|---|---|
| | p-DCB | o-DCB | m-DCB | NaSH | NaOH | NaOAc | LiCl | NaCl | DCB |
| Ex. 1 | 95 | 5 | 0 | 1.0 | 1.05 | 0.35 | 0 | 0 | 1.04 |
| Ex. 2 | 95 | 5 | 0 | 1.0 | 1.05 | 0.4 | 0 | 0 | 1.04 |
| Ex. 3 | 95 | 5 | 0 | 1.0 | 1.05 | 0.42 | 0 | 0 | 1.04 |
| Ex. 4 | 95 | 5 | 0 | 1.0 | 1.05 | 0.44 | 0 | 0 | 1.04 |
| Ex. 5 | 90 | 10 | 0 | 1.0 | 1.05 | 0.42 | 0 | 0 | 1.04 |
| Ex. 6 | 90 | 10 | 0 | 1.0 | 1.05 | 0.44 | 0 | 0 | 1.04 |
| Comp. Ex. 1 | 100 | 0 | 0 | 1.0 | 1.05 | 0.35 | 0 | 0 | 1.04 |
| Comp. Ex. 2 | 95 | 0 | 5 | 1.0 | 1.05 | 0.35 | 0 | 0 | 1.04 |
| Comp. Ex. 3 | 90 | 0 | 10 | 1.0 | 1.05 | 0.35 | 0 | 0 | 1.04 |
| Comp. Ex. 4 | 95 | 5 | 0 | 1.0 | 1.05 | 0.2 | 0 | 0 | 1.04 |
| Comp. Ex. 5 | 95 | 5 | 0 | 1.0 | 1.05 | 0.6 | 0 | 0 | 1.04 |
| Comp. Ex. 6 | 95 | 5 | 0 | 1.0 | 1.05 | 0 | 0.44 | 0 | 1.04 |
| Comp. Ex. 7 | 95 | 5 | 0 | 1.0 | 1.05 | 0 | 0 | 0.44 | 1.04 |

Experimental Example 1

Physical properties of the polyphenylene sulfides prepared in Examples and Comparative Examples were measured by the following methods, and the results are shown in Table 2 below.

1) Yield (%)

After weighing the dried polyphenylene sulfide (PPS) with an electronic balance, the number of moles was calculated based on a repeating unit value (108.16 g/mol). That is, the yield of the polymer actually recovered (mol/mol %) was calculated based on the number of moles of sodium sulfide added less or the number of moles of para-dichlorobenzene.

In particular, in order to measure the yield more precisely, the conventional method of measuring the yield without completely removing substances that are well dissolved in organic solvents or hot water from the slurry was not applied, wherein the conventional method only performs sieving after diluting the polyphenylene sulfide (PPS) slurry obtained after polymerization with water at room temperature for washing. Instead, the slurry was washed with hot washing water and hot organic solvents at least three times, and then dried in a high temperature vacuum oven for one day to measure the yield.

2) Melt Flow Rate (MFR)

The melt flow rate (MFR) of the polyphenylene sulfide prepared in Examples and Comparative Examples was measured in accordance with the American Society for Testing and Materials, ASTM D 1238.

At this time, using a Gottfert MI-4 apparatus, each polyphenylene sulfide was heated at a temperature of 315° C. for 4 minutes, and then placed under a load of 5 kg. The molten material was weighed by the timed segments of the extrudate, and then, an extrusion rate (g/10 min) was calculated by the weight (g) of the molten extrudate per 10 minutes.

3) Melting Temperature (Tm, ° C.)

The melting point (Tm, ° C.) was measured using differential scanning calorimeter (DSC, manufactured by TA instrument, TA Q2000).

Specifically, each polyarylene sulfide was heated to 325° C., and maintained at that temperature for 5 minutes. After that, the temperature was lowered to 50° C., and increased again to 325° C. The temperature at the top of the DSC (Differential Scanning calorimeter, manufactured by TA) curve was referred to as the melting point. Herein, the temperature was increased and lowered at a rate of 10° C./min, respectively, and the melting point was confirmed at the second heating period.

4) Crystallinity (%)

The crystallinity (%) was measured using differential scanning calorimeter (DSC, manufactured by TA instrument, TA Q2000) according to the method described in Materials Chemistry and Physics 2012, 131 (3), 605-614.

Specifically, delta Hc (ΔHc, J/g) of the polyphenylene sulfide was measured using differential scanning calorimeter (DSC, manufactured by TA instrument, TA Q2000), and the crystallinity (%) was measured according to the following Equation 1.

$$\text{Crystallinity (\%)} = [(\Delta H_f - \Delta H_c)/\Delta H_f^\circ] 100 \quad \text{[Equation 1]}$$

In Equation 1, delta Hf ($\Delta H_f$) is the enthalpy of fusion (Tm) of polyphenylene sulfide, delta Hc (ΔHc) is the recrystallization enthalpy of polyphenylene sulfide (a peak around 150° C.), and delta $H_f^\circ$ ($\Delta H_f^\circ$) is the enthalpy of fusion of polyphenylene sulfide when the crystallinity is assumed to be 100%. For reference, the enthalpy of fusion of polyphenylene sulfide when the crystallinity is assumed to be 100% is known as 80 J/g (see Polymer Data Handbook).

TABLE 2

|  | Yield (%) | MFR (g/10 min) | Tm (° C.) | Crystallinity (%) |
|---|---|---|---|---|
| Ex. 1 | 79.6 | 799 | 272 | 25.07 |
| Ex. 2 | 80.6 | 802 | 273.3 | 25.42 |
| Ex. 3 | 82.7 | 753 | 266.52 | 21.95 |
| Ex. 4 | 84.1 | 732 | 263.43 | 20.24 |
| Ex. 5 | 83.9 | 974 | 240.94 | 6.73 |
| Ex. 6 | 84.4 | 865 | 240.43 | 5.08 |
| Comp. Ex. 1 | 80.2 | 682 | 284.71 | 54.58 |
| Comp. Ex. 2 | 78.7 | 1194 | 269.1 | 45.13 |
| Comp. Ex. 3 | 73.1 | 1504 | 254.91 | 26.4 |
| Comp. Ex. 4 | 72.3 | 1574 | 274.2 | 28.85 |
| Comp. Ex. 5 | 70.2 | 1642 | 275.71 | 27.16 |
| Comp. Ex. 6 | 48.9 | — | — | — |
| Comp. Ex. 7 | 50.4 | — | — | — |

Figure 2:
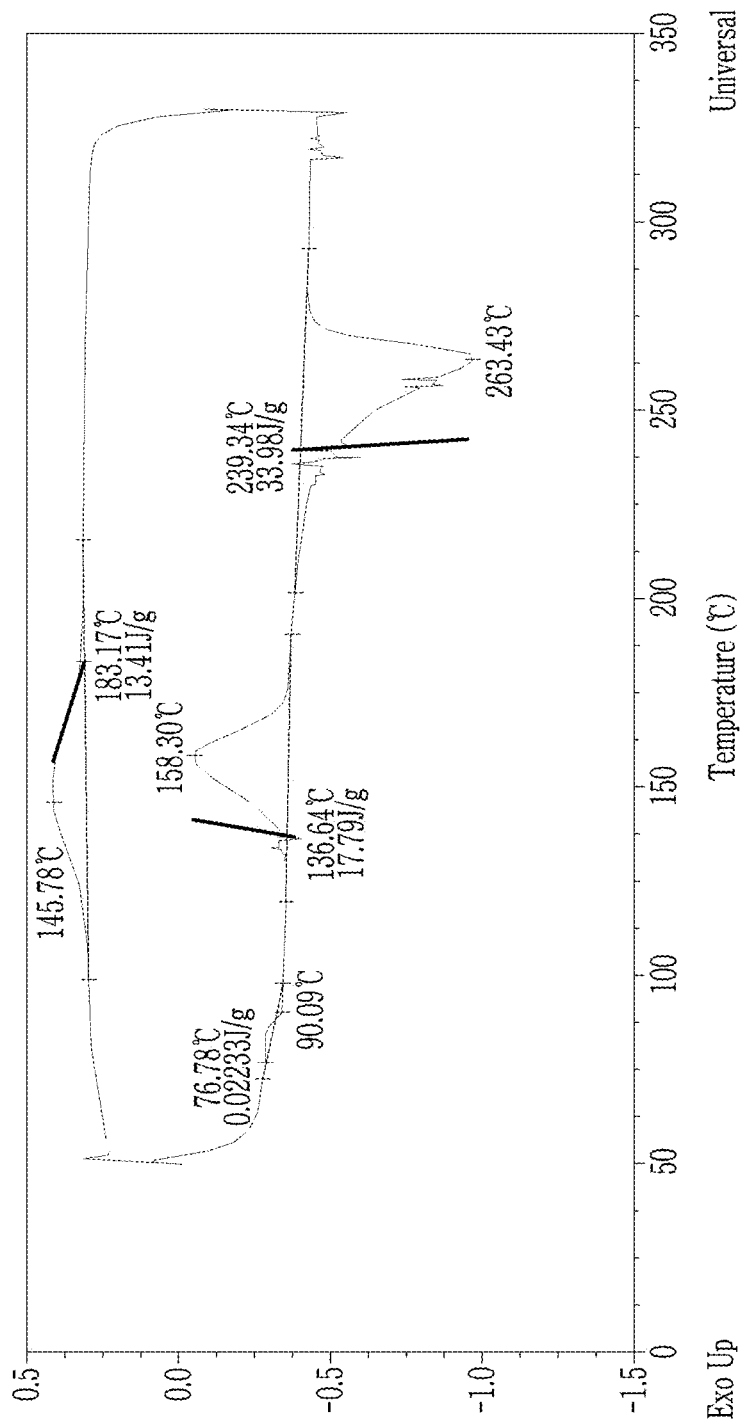
FIG. 2 is a graph generated using a differential scanning calorimeter (DSC, manufactured by TA instrument, TA Q2000) for the polyphenylene sulfide of Example 4, according to one embodiment of the present disclosure.
Figure 3:
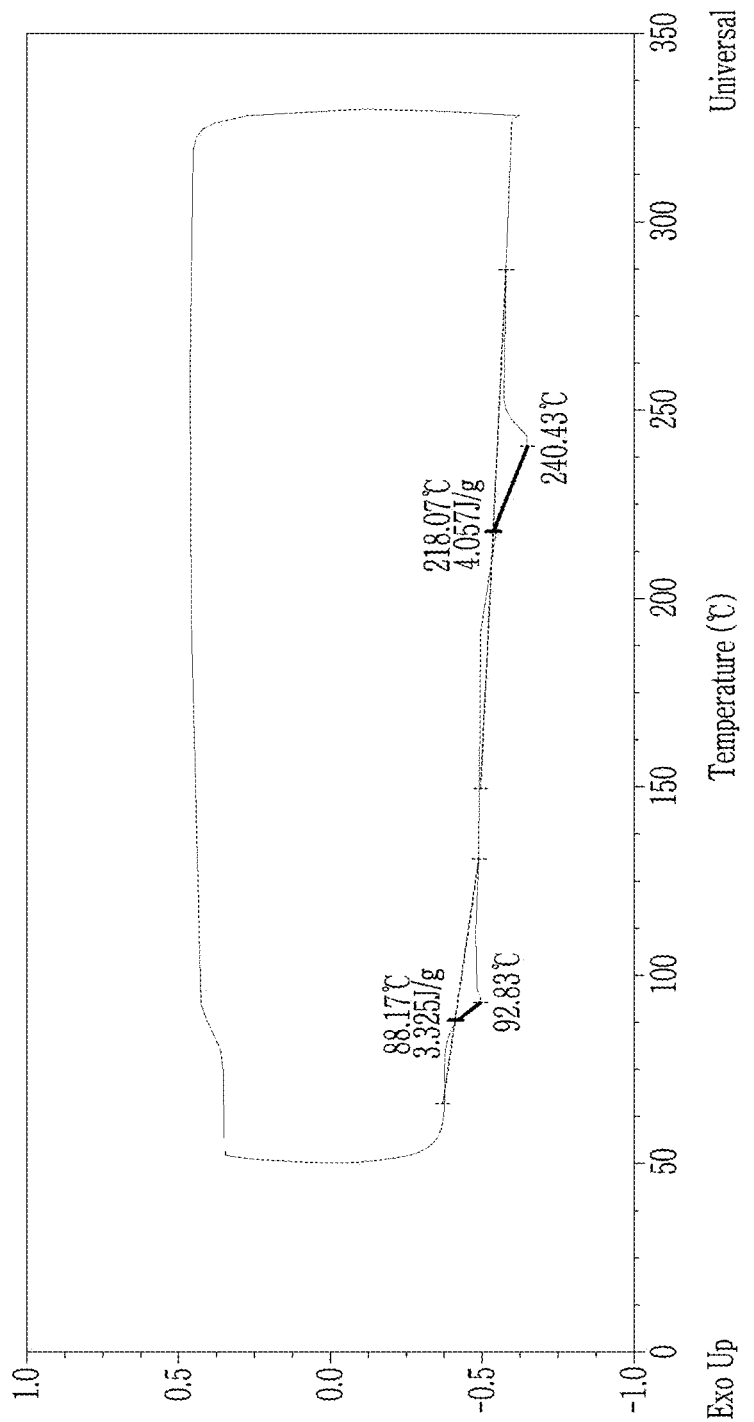
FIG. 3 is a graph generated using a differential scanning calorimeter (DSC, manufactured by TA instrument, TA Q2000) for the polyphenylene sulfide of Example 6, according to one embodiment of the present disclosure.
Figure 4:
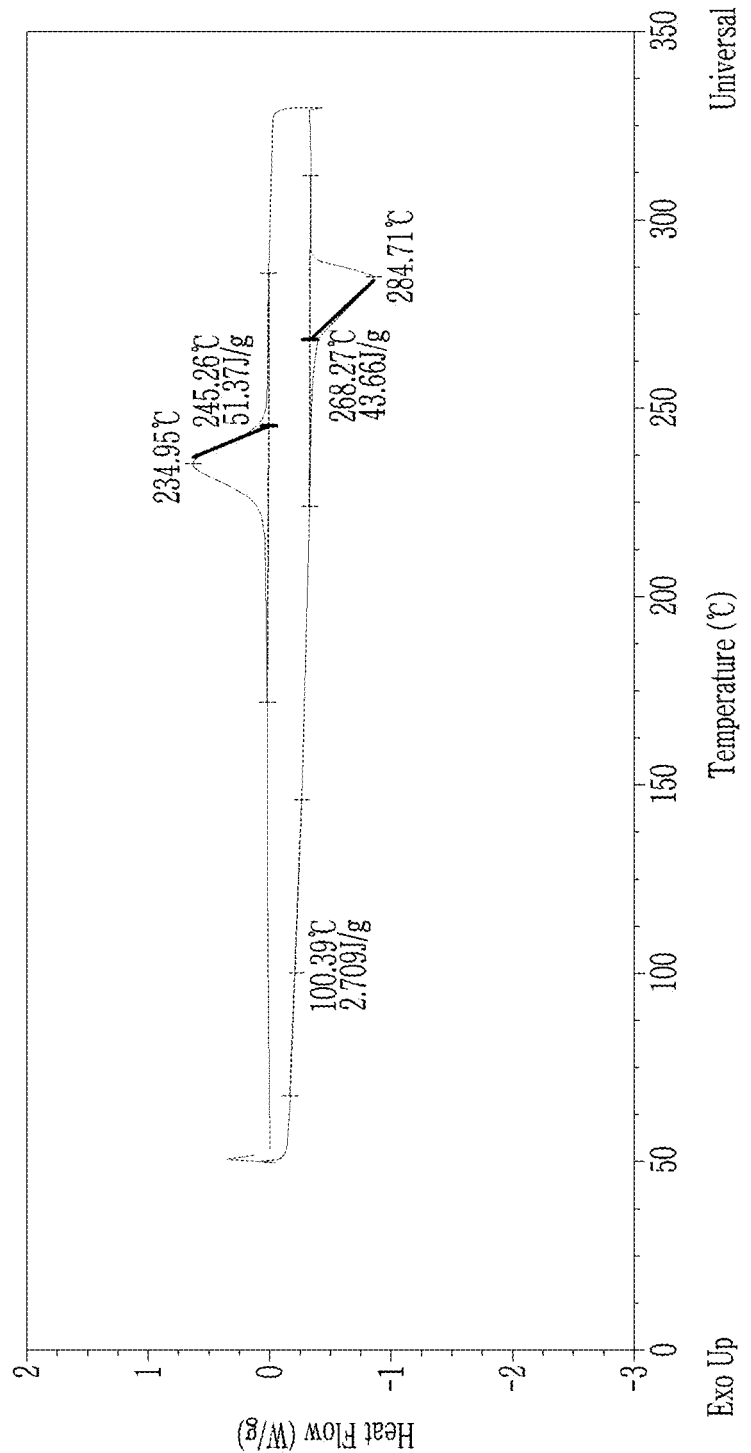
FIG. 4 is a graph measured generated using a differential scanning calorimeter (DSC, manufactured by TA instrument, TA Q2000) for the polyphenylene sulfide of Comparative Example 1.

Further, FIGS. 2 to 4 show graphs measured using differential scanning calorimeter (DSC, manufactured by TA instrument, TA Q2000) for the polyphenylene sulfides prepared according to Example 4, Example 6, and Comparative Example 1, respectively. According to the DSC graphs of FIGS. 2 to 4, the polyphenylene sulfides of Examples 4 and 6 showed lower melting points (Tm) and crystallization temperatures than those of Comparative Example 1. Accordingly, it can be seen that the crystallinity of polyphenylene sulfides of Examples 4 and 6 was significantly lower than that of Comparative Example 1.

As shown in Table 2, the present disclosure may prepare low temperature thermosetting polyarylene sulfides of Examples 1 to 6 having crystallinity of 25.42% or less so as to have excellent laser welding property even when used in a molded product while having high mechanical properties such as melt flow rate of 974 g/10 min or less at a high yield of 79.6% or more, by optimizing and adding a specific weak acid salt of an alkali metal and ortho-dihalo aromatic compound of the dihalogenated aromatic compound in preparing a polyarylene sulfide (PAS) according to the present disclosure.

On the other hand, it was confirmed that Comparative Examples 1 to 7 are difficult to prepare a low temperature thermosetting polyarylene sulfide maintaining both the crystallinity and the melt flow rate low as described above. Particularly, in the case of Comparative Example 1 without using ortho-dichlorobenzene (o-DCB) and Comparative Example 2 using meta-dichlorobenzene (m-DCB), the crystallinity was increased to 54.58% and 45.13%, resulting in poor laser welding properties. Thus, they were not suitable for a molded product on the transmitting side of laser beam. In addition, in the case of Comparative Example 3 in which the meta-dichlorobenzene (m-DCB) content was increased and Comparative Examples 4 and 5 in which the sodium acetate (NaOAc) content was changed, the reaction yield was only 70.2% to 73.1%, and the melt flow rate was increased to 1504 g/10 min, 1574 g/10 min, and 1642 g/10 min, resulting in poor mechanical properties. In addition, durability and chemical resistance may be lowered when processing molded products. In addition, in the case of Comparative Examples 6 and 7 using lithium chloride (LiCl) or sodium chloride (NaCl) instead of sodium acetate (NaOAc), the reaction yield was significantly reduced to 48.9% and 50.4%, indicating that the polymerization reaction itself was impossible.

The invention claimed is:

1. A preparation method of a polyarylene sulfide, comprising:
   preparing a sulfur source comprising a sulfide of an alkali metal and a mixed solvent by dehydrating a hydrosulfide of an alkali metal and a hydroxide of an alkali metal in the presence of a weak acid salt of an alkali metal in a mixed solvent of water and an amide-based compound, wherein the dehydrating is performed at a temperature of 185° C. to 205° C., wherein the weak acid salt of an alkali metal is used in an amount of 0.35 to 0.5 equivalents based on 1 equivalent of the hydrosulfide of an alkali metal; and
   preparing a polyarylene sulfide by adding a dihalogenated aromatic compound and an amide-based compound to a reactor containing the sulfur source, and performing a polymerization reaction;
   wherein the dihalogenated aromatic compound comprises a para-dihalo aromatic compound and an ortho-dihalo aromatic compound in a molar ratio of 95:5 to 90:10,
   wherein the polyarylene sulfide has a melt flow rate (MFR) measured at 315° C. under a load of 5 kg in accordance with ASTM D 1238 of 500 to 1200 g/10 min.

2. The preparation method of a polyarylene sulfide according to claim 1, wherein the weak acid salt of an alkali metal comprises lithium acetate, sodium acetate, or a mixture thereof.

3. The preparation method of a polyarylene sulfide according to claim 1, wherein the ortho-dihalo aromatic compound of the dihalogenated aromatic compound comprises at least one selected from the group consisting of o-dihalobenzene, o-dihalotoluene, and o-dihalobenzoic acid.

4. The preparation method of a polyarylene sulfide according to claim 1, wherein the para-dihalo aromatic compound of the dihalogenated aromatic compound comprises at least one selected from the group consisting of p-dihalobenzene, p-dihalotoluene, and p-dihalobenzoic acid.

5. The preparation method of a polyarylene sulfide according to claim 1, wherein the dihalogenated aromatic compound is used in an amount of 0.8 to 1.2 equivalents based on 1 equivalent of the hydrosulfide of an alkali metal.

6. The preparation method of a polyarylene sulfide according to claim 1, wherein the amide-based compound is added so as to have a molar ratio of 2.5 to 4.0 based on 1 mol of sulfur in the second step.

7. The preparation method of a polyarylene sulfide according to claim 1, wherein the polymerization reaction is performed at a temperature of 200° C. to 300° C.

8. The preparation method of a polyarylene sulfide according to claim 1, wherein the polyarylene sulfide is produced at a yield of 75% or more, and crystallinity of 26.5% or less.

9. The preparation method of a polyarylene sulfide according to claim 1, wherein the dehydrating is performed while stirring at 300 to 500 rpm.

10. The preparation method of a polyarylene sulfide according to claim 1, wherein the polymerization reaction includes a pre-polymerization process and a post-polymerization process, wherein the pre-polymerization process is performed at a temperature of 200° C. to 245° C. for 1.5 to 4 hours, and the post-polymerization process is performed at a temperature of 250° C. to 260° C. for 0.3 to 2 hours.

11. The preparation method of a polyarylene sulfide according to claim 1, wherein the dehydrating is carried out until a molar ratio of water remaining in the system after the dehydrating to 1 mol of effective sulfur is 1.5 to 3.5.

12. The preparation method of a polyarylene sulfide according to claim 1, further comprising lowering the temperature to 150° C. to 200° C. between the dehydrating and the polymerization reaction.

* * * * *